United States Patent [19]

Gun

[11] Patent Number: 5,294,252
[45] Date of Patent: Mar. 15, 1994

[54] COMPOSITION FOR PRODUCING A MONOMOLECULAR FILM, ON SURFACES OF VARIOUS MATERIALS

[76] Inventor: Julio O. Gun, Buenos Aires, Argentina

[21] Appl. No.: 920,615

[22] Filed: Jul. 27, 1992

Related U.S. Application Data

[63] Continuation-in-part of Ser. No. 606,760, Oct. 31, 1990, abandoned.

[51] Int. Cl.$^5$ .................................................. C09D 4/00
[52] U.S. Cl. ............................ 106/287.13; 106/287.14; 106/287.15; 106/285
[58] Field of Search ..................... 106/287.13, 287.14, 106/287.15, 285

[56] References Cited

U.S. PATENT DOCUMENTS

| | | | |
|---|---|---|---|
| Re. 33,759 | 12/1991 | DePasquale et al. | 106/287.14 |
| 2,721,873 | 10/1955 | MacKenzie | 260/448.2 |
| 2,832,794 | 4/1958 | Gordon | 106/287.13 |
| 3,395,036 | 7/1968 | Campbell | 106/287.14 |
| 3,960,800 | 6/1976 | Kohl | 556/442 |
| 4,026,826 | 5/1977 | Yoshida | 528/12 |
| 4,073,967 | 2/1978 | Sandvig | 427/503 |
| 4,173,489 | 11/1979 | Crawford et al. | 106/287.14 |
| 4,263,051 | 4/1981 | Crawford | 106/484 |
| 4,373,061 | 2/1983 | Ching | 524/837 |
| 4,724,022 | 2/1988 | Armstrong | 106/287.13 |

Primary Examiner—David Brunsman
Attorney, Agent, or Firm—Kuhn and Muller

[57] ABSTRACT

Different materials (glass, paper, etc.) may be coated with extremely stable and transparent thin films. An organic chemical solution is formed by at least 75% by volume of an organic solvent selected from linear saturated hydrocarbons, benzene, toluene, dodecylbenzene, bicyclohexyl linear monoamides and preferably saturated isoparafinic hydrocarbons (electroate dispersants) and an active compound selected from linear hydrogenated, perfluorinated or hydrogenated-fluorinated trichlorosilane molecules is employed and the coated surface exhibits super hydrophobic properties.

12 Claims, No Drawings

COMPOSITION FOR PRODUCING A MONOMOLECULAR FILM, ON SURFACES OF VARIOUS MATERIALS

This is a continuation-in-part of application Ser. No. 07/606,760, filed Oct. 31, 1990, now abandoned.

BACKGROUND OF THE INVENTION

1. Field of the Invention

The instant invention relates to a composition for producing a hydrophobic film on the surfaces of various materials and, more particularly, it relates to coating compositions by means of which deposition on a surface of a stable and transparent monomolecular film may be obtained for providing such surface with super-hydrophobic properties, i.e. water-repelling properties, at the same time maintaining the appearance of said surface.

2. Description of the Related Art

Although several substances are known in the art for treating surfaces of different materials, providing such surfaces with different properties, no commercial composition is known which permits the formation of extremely thin film, e.g. a stable and transparent monomolecular film of several angstroms thickness or even thinner, providing super-hydrophobic properties.

SUMMARY OF THE INVENTION

In accordance with the present invention there is provided a non-aqueous coating composition which is suitable for applying an extremely thin, stable film over the surface of a variety of substrates at room temperature affording hydrophobic properties to such substrates, i.e., water repellancy, without detrimentally affecting the appearance, transparency or other properties thereof.

Among the materials the surfaces of which may be coated with the composition of the invention, the following may be mentioned, without implying any limitation:

Glass, the surface of which is turned super-hydrophobic while maintaining its transparency and original stability. For example, in buildings, windowpanes treated by the composition of the invention may be easily cleaned since, as water is completely drained off due to the super-hydrophobic properties acquired by the glass, they are completely dry avoiding in consequence the final step of rinsing and drying. It is to be understood that the composition of the invention may be applied to flat and curved glass, powder, fibers and their combinations with other materials. Cellulosic materials and derivatives thereof, such as pulp, paper, cardboard, cellophane, esters, ethers, synthetic fibers, wood, filters and combinations thereof, thus obtaining cardboard and papers which are highly repellent to water and mositure, thus increasing their life and strength. The same happens with wood, and with natural and synthetic cork, which become highly repellent to water extending their life. Pure and non pure metals, steels, alloys and combinations thereof with other materials, which upon being provided with high water rejection, are less prone to oxidation and corrosion.

Protective coatings which are turned highly repellent to water, increasing consequently the protection characteristics thereof for the materials they are coating such as coatings for cotton and its derivatives, pure yarns and those blended with synthetic materials which, as they are highly water repellent, increase their waterproof characteristics.

Leather, which when coated with the composition of the invention, increases its life. Synthetic polymers, such as plastics, elastomers, expanded materials, yarns, clothes and filters which, when coated with the composition of the invention, decrease the cleaning time and favor the waterproof effect. Clay or ceramic materials which, upon being made highly water repellent by virtue of the composition of the invention, increase their life, and, finally, minerals and construction insulating materials which, upon being coated with the composition of the invention, decrease the possibility of moisture attack.

DESCRIPTION OF THE PREFERRED EMBODIMENTS

The coating composition of the invention comprises between $0.5 \times 10^{-5}$ and $3 \times 10^{-2}$ moles/liter of an active organo trichlorosilane compound selected from:

(A) $CH_3-(CH_2)n-SiCl_3$, wherein $n=12$ to 17; (B) $CF_3-(CF_2)_k-(CH_2)_2-SiCl_3$, wherein $k=3, 5, 7$ or 11; and (C) $CF_3-(CF_2)p-(CH_2)_2-O-C(0)-(CH_2)q SiCl_3$, wherein $p=3$ to 10 and $q=4$ to 10; and at least 75% by volume of an organic solvent selected from linear saturated hydrocarbons having 5 to 16 carbon atoms, benzene, toluene, dodecylbenzene, linear chain monoamide having 7 to 18 carbons atoms and preferably, saturated isoparafinic hydrocarbons (electrostatic dispersants) such as isoparaffinic hydrocarbons compounds available commercially from Exxon Corporation under the Tradename ISOPAR G, and from Philip A. Hunt Chemical Corporation under the tradename #867457. Solvents that effect rapid drying at room temperature can be advantageously used in preparing compositions of the present invention.

Optionally, coating compositions of the invention can be prepared with up to 25% by volume of a stablizier selected from the group consisting of methylene chloride, chloroform, carbon tetrachloride or mixtures thereof. Also optionally suitable for use are catalysts selected from the group formed by pyridine and acetic acid up to $1.0 \times 10^{-1}$ moles/liter.

Active organo trichlorosilanes suitable for use in the compositions of the invention include linear saturated compounds such as octadecyltrichlorosilane, n-dodecyltrichlorosilane and the like available from Aldrich, Merck, Sigma, Silar and Huls America. Also suitable are linear saturated trichlorosilanes of formula (B) available commercially from Silar and Huls America.

Suitable trichlorosilane compounds of formula (C) such as 1H, 1H, 2H, 2H perfluorododecyl-11-trichlorosilane undecanoate, $CF_3-(CF_2)_9-(CH_2)_2-O-C(O)-(CH_2)_{10}-SiCl$ are prepared by the esterification reaction of dicyclohexyl-carbodiimide and 4-dimethylaminopyridine and then the $H_2PtCl_6$ catalyzed additions of $SiHCl_3$ to the esterification reaction product.

In a preferred embodiment of a coating composition of the invention, formulation having the following proportion of ingredients is prepared: solvent, 85% by volume of ISOPAR G; stablizers; 7.5% by volume of carbon tetrachloride and, 4.7% by volume of chloroform; and trichlorosilane active compound, 0.3% by volume of octadecyltrichlorosilane. Preferably, the solution is prepared by adding the active trichlorosilane compound to the stabilizers, and then adding the solvent to the admixture.

A very thin, stable film (monomolecular film) which effects superior hydrophobic properties to the surface of a substrate made of a wide variety of materials as herein described can be applied in accordance with the practice of the invention by dipping or the like conventional procedures. Thus, the material to be treated is for example, dipped in a coating composition of the invention for a short time e.g. about a few seconds to 10 minutes, at room temperature and then, after removal from immersion in the coating composition, the coating is permitted to dry at room temperature. A stable thin film coating (monomolecular film) is thus formed which does not detrimentally affect the clarity, appearance or other physical properties of the substrate.

For example, the coating of glass can be performed by dipping glass pieces into a coating composition herein above described at room temperature for about one minute. The glass pieces are then dried at room temperature to affect the desired hydrophobic properties to the surface thereof.

While a prefered embodiment of the invention has been described and shown, it is to be clearly understood that the same is susceptible to numerous changes and modifications apparent to those skilled in the art. Therefore, the invention is not limited to details shown and described but intend to show all changes and modifications which come within the scope of the appended claims

What is claimed is:

1. A composition for producing a substantially monomolecular film on a substrate comprising a non-aqueous solution comprised of at least 75 percent by volume of an organic compound selected from linear saturated hydrocarbons having 5 to 16 carbon atoms, benzene, dodecylbenzene, bicyclohexyl and linear chain monoamide having 7 to 18 carbon atoms and saturated isoparafinic hydrocarbons, and between $5 \times 10^{-5}$ and $3 \times 10^{-2}$ moles/liter of an active organic trichlorosilane compound selected from $CH_3-(CH_2)_n-SiCl_3$, wherein n=12 to 17; $CF_3-(CF_2)_k-(CH_2)_2-SiCL_3$, wherein k=3, 5, 7 or 11; and $CF_3-(CF_2)_p-(CH_2)_2-O-C(O)-(CH_2)_q-SiCL_3$, wherein p=3 to 10 and q=4 to 10.

2. The composition as claimed in claim 1, wherein said non-aqueous solution further comprises a stabilizer selected from the group consisting of methylene, chloride, chloroform, carbon tetrachloride and mixtures thereof, said stabilizer being present in said solution in an amount to about 25 percent by volume.

3. The composition according according to claim 2, wherein said stabilizer is present in said solution in an amount of at least about 4.5 percent by volume.

4. The composition as claimed in claim 1, wherein said non-aqueous solution further comprises a catalyst selected from pyridine and acetic acid, said catalyst being present in said solution in an amount to about $1.0 \times 10^{-1}$ moles/liter.

5. The composition as claimed in claim 1, wherein said organic compound is a saturated isoparafinic hydrocarbon.

6. The composition as claimed in claim 1, wherein said active organic trichlorosilane has the formula $CH_3-(CH_2)_n-SiCl_3$ wherein n=12 to 17.

7. The composition according to claim 1, wherein a thin, stable film coating is formed therefrom over a substrate surface at room temperature which effects hydrophobic properties to said substrate surface.

8. The composition according to claim 1, wherein said organic compound is a solvent that effects rapid drying at room temperature.

9. The composition according to claim 1, wherein a thin, stable film formed therefrom over a substrate surface is transparent.

10. The composition according to claim 1, wherein said active organic trichlorosilane compound is $CF_3-(CF_2)_p-(CH_2)_2-O-C(O)-(CH_2)_q-SiCL_3$, wherein p=3 to 10 and q=4 to 10.

11. The composition according to claim 1, wherein said non-aqueous solution is comprised of at least 75 percent by volume of a saturated isoparafinic hydrocarbon solvent, between $5 \times 10^{-5}$ and $3 \times 10^{-2}$ moles per liter of said active organo trichlorosilane compound, and at least about 45 percent by volume of a stabilizer selected from the group consisting of methylene chloride, chloroform, carbon tetrachloride and mixtures thereof.

12. The composition according to claim 1, wherein said non-aqueous composition contains about 0.3 percent by volume of said active organo trichlorosilane compound.

* * * * *